(12) United States Patent
Tornquist et al.

(10) Patent No.: US 7,015,617 B2
(45) Date of Patent: *Mar. 21, 2006

(54) HIGH SPEED GENERATOR WITH ROTOR COIL SUPPORT ASSEMBLIES SECURED TO INTERLAMINATION DISKS

(75) Inventors: Gerald E. Tornquist, Tuscon, AZ (US); Gregor McDowall, Tucson, AZ (US); Mingzhou Xu, Tucson, AZ (US); David B. Kane, Tucson, AZ (US); Norman O. Harris, Jr., Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 170 days.

This patent is subject to a terminal disclaimer.

(21) Appl. No.: 10/629,999

(22) Filed: Jul. 29, 2003

(65) Prior Publication Data
US 2005/0023924 A1    Feb. 3, 2005

(51) Int. Cl.
H02K 3/48  (2006.01)
H02K 9/08  (2006.01)

(52) U.S. Cl. .................... 310/216; 310/214
(58) Field of Classification Search ............. 310/214, 310/216, 217, 58, 60–61, 60 A
See application file for complete search history.

(56) References Cited

U.S. PATENT DOCUMENTS

| | | | |
|---|---|---|---|
| 2,221,983 A * | 11/1940 | Mayer et al. ............. 428/213 |
| 3,110,827 A | 11/1963 | Baudry | |
| 3,119,033 A | 1/1964 | Horsley et al. | |
| 3,480,810 A | 11/1969 | Potter | |
| 3,659,129 A * | 4/1972 | Pettersen ................ 310/216 |
| 3,766,417 A | 10/1973 | Hallenbeck | |
| 3,962,594 A | 6/1976 | Karpman et al. | |
| 4,127,786 A * | 11/1978 | Volkrodt ................ 310/156.84 |
| 4,252,035 A | 2/1981 | Cordner et al. | |
| 4,268,773 A | 5/1981 | Beck et al. | |
| 4,403,161 A * | 9/1983 | Miyashita et al. ...... 310/156.83 |
| 4,562,641 A | 1/1986 | Mosher et al. | |
| 4,564,777 A | 1/1986 | Senoo et al. | |
| 4,588,914 A | 5/1986 | Heyne | |
| 4,591,749 A | 5/1986 | Gauthier et al. | |
| 4,603,274 A | 7/1986 | Mosher | |
| 4,614,999 A | 9/1986 | Onodera et al. | |
| 5,036,238 A | 7/1991 | Tajima | |
| 5,091,668 A * | 2/1992 | Cuenot et al. ......... 310/156.61 |
| 5,136,195 A | 8/1992 | Allen, III et al. | |
| 5,140,204 A | 8/1992 | Cashmore et al. | |
| 5,191,256 A | 3/1993 | Reiter, Jr. et al. | |
| 5,298,823 A | 3/1994 | Johnsen | |
| 5,495,133 A | 2/1996 | Bawin et al. | |
| 5,554,900 A * | 9/1996 | Pop, Sr. ................ 310/156.61 |
| 5,587,616 A | 12/1996 | Johnsen | |
| 5,763,976 A | 6/1998 | Huard | |
| 5,796,196 A | 8/1998 | Johnsen et al. | |
| 5,955,811 A | 9/1999 | Chiba et al. | |
| 6,054,790 A | 4/2000 | Kjeer et al. | |
| 6,225,723 B1 * | 5/2001 | Cooper et al. ............. 310/214 |
| 6,601,287 B1 * | 8/2003 | Pop, Sr. ................. 29/596 |
| 2002/0125785 A1 | 9/2002 | Kylander et al. | |

* cited by examiner

Primary Examiner—Tran Nguyen
(74) Attorney, Agent, or Firm—Ingrassia Fisher & Lorenz

(57) ABSTRACT

A rotor for a high speed generator is constructed of a plurality of laminations and interlamination disks, which are disposed between each of the laminations. A coil support assembly is disposed within each of the rotor interpole regions and is secured to the interlamination disks.

22 Claims, 6 Drawing Sheets

HIGH SPEED GENERATOR WITH ROTOR COIL SUPPORT ASSEMBLIES SECURED TO INTERLAMINATION DISKS

TECHNICAL FIELD

The present invention relates to high speed generators and, more particularly, to high speed generators that are used with gas turbine engines such as those used in aircraft, tanks, ships, terrestrial vehicles, or other applications.

BACKGROUND

A generator system for a gas turbine engine, such as that found in aircraft, ships, and some terrestrial vehicles, may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a generator control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator, and this three-phase AC output can then be provided to a load such as, for example, an aircraft, ship, or vehicle electrical system.

Because some aircraft generators are high speed generators with potential rotational speeds up to and in excess of 24,000 rpm, potentially large centrifugal forces may be imposed upon the rotors in generators. Given these potentially stressful operating conditions, the rotors should be carefully designed and manufactured, so that the rotors are reliable and precisely balanced. Improper balancing not only can result in inefficiencies in the operation of a generator, but may also affect the reliability of the generator.

Among the components of a rotor that provide increased reliability and proper balancing of the rotors are the wire coils wound on the rotor. The centrifugal forces experienced by a rotor may be strong enough to cause bending of the wires of these coils into what is known as the interpole region. Over time, such bending can result in mechanical breakdown of the wires and compromise of the coil insulation system. Additionally, because the coils are assemblies of individual wires that can move to some extent with respect to one another and with respect to the remaining portions of the rotors, the coils are a potential source of imbalance within the rotor and can potentially compromise the insulation system. Even asymmetrical movements of these coils on the order of only a few thousandths of an inch can, in some instances, be significant.

In order to improve the strength and reliability of the wire coils and the coil insulation system, and to minimize the amount of imbalance in the rotors that may occur due to the wire coils, the rotors may include a coil retention system. With a coil retention system, substantially rigid wedges are inserted in between neighboring poles of the rotors to reduce the likelihood of coil wire bending or movement. In some embodiments, the wedges may also exert some force onto the coils to help maintain the physical arrangement of the coils.

In addition to the rotor, various other mechanical components within the generator rotate at high speeds and thus may be supplied with lubricant. Moreover, some of the electrical components within the generator may generate heat due to electrical losses, and may thus be supplied with a cooling medium. The lubricating and cooling media may be supplied from different systems, or from a single system that supplies a fluid, such as oil, that acts as both a lubricating and a cooling medium. The lubricating and cooling medium supplied to the generator may flow into and through the shaft on which the main generator rotor is mounted, and be supplied to the various mechanical and electrical components via flow orifices formed in the shaft.

Although the wedges employed in conventional coil retention systems operate safely, the design of these conventional wedges also limits their effectiveness. For example, during rotor rotation some of these conventional wedges may experience some radial movement. This radial movement can chafe the insulation around the rotor windings, and/or cause rotor imbalance, and/or increase windage losses, and/or damage the lamination pole tips.

Hence there is a need for a coil support system that can provide sufficient support for the rotor coils during generator operation and/or that can provide cooling for the coils, without causing rotor winding insulation chafing, and/or rotor imbalance, and/or increased windage losses, and/or lamination pole tip damage. The present invention addresses one or more of these needs.

BRIEF SUMMARY

The present invention provides a coil support system that is secured to interlamination disks in the rotor, thereby increasing the overall reliability of the generator by making it less likely to cause damage and/or imbalance in the rotor.

In embodiment, and by way of example only, a high speed generator includes a stator, and a rotor. The rotor is rotationally mounted at least partially within the stator, and includes a shaft, at least a first and a second pole, and interlamination disk, and a coil support assembly. Each pole is formed of at least a plurality of laminations, extends radially outwardly from the shaft, and is spaced apart from one another to form an interpole region therebetween. The interlamination disk is disposed between at least two of the laminations. The coil support assembly is positioned in the interpole region and is coupled to the interlamination disk.

In another exemplary embodiment, a rotor for use in a high speed generator includes a shaft, at least a first and a second pole, an interlamination disk, and a coil support assembly. Each pole is formed of at least a plurality of laminations, extends radially outwardly from the shaft, and is spaced apart from one another to form an interpole region therebetween. The interlamination disk is disposed between at least two of the laminations. The coil support assembly is positioned in the interpole region and is coupled to the interlamination disk.

In yet another exemplary embodiment, an interpole coil support assembly for placement in an interpole region that is formed between adjacent poles of a rotor assembly includes a lower support wedge, an upper support, one or more upper support retainers, and one or more fasteners. The lower support wedge has a longitudinally extending main body that has at least first and second opposed sides, and one or more openings extending through the main body between the first and second sides. The upper support has a longitudinally extending main body that has at least an inner surface, an outer surface, and one or more openings extending therebetween. Each upper support retainer has at least two side surfaces, a top surface coupled between the side surfaces, a bottom surface coupled between the side surfaces, and an opening extending between the top and bottom surfaces. Each retainer side surface is configured to engage the upper support inner surface. Each fastener is adapted to extend through the opening in the upper support retainer, through one of the openings in the upper support, and through one of the openings in the lower support wedge.

Other independent features and advantages of the preferred coil support system will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present embodiment is, for convenience of explanation, depicted and described as being implemented in a brushless AC (alternating current) generator, it will be appreciated that it can be implemented in other AC generator designs needed in specific applications.

Figure 1:
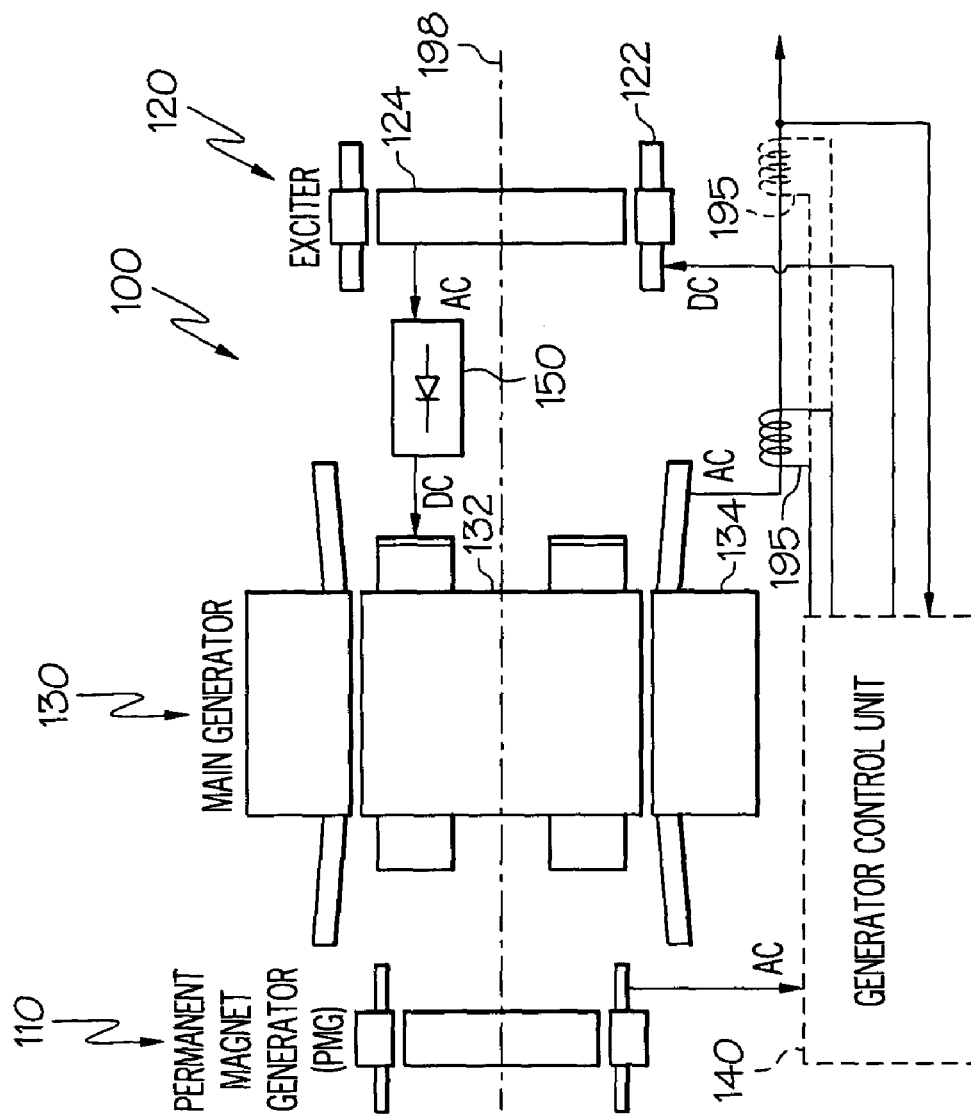
FIG. 1 is a functional schematic block diagram of an exemplary high speed generator system.

Turning now to the description, and with reference first to FIG. 1, a functional schematic block diagram of an exemplary high speed generator system 100 for use with a gas turbine engine such as that in an aircraft is depicted. This exemplary generator system 100, which is commonly known as a brushless AC generator, includes a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m., or greater. As the PMG rotor 112 rotates, the PMG 110 generates and supplies AC power to the generator control unit 140, which in turn supplies direct current (DC) power to a stator 122 of the exciter 120. The exciter rotor 124 in turn supplies AC power to the rectifier assemblies 150. The output from the rectifier assemblies 150 is DC power and is supplied to the main generator rotor 132, which in turn outputs AC power from a main generator stator 134.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG rotor 112, the exciter rotor 124, and the main generator rotor 132 all rotate along a single axis 198 at the same rotational speed. It will be appreciated, however, that in other embodiments the PMG rotor 112 may rotate along a different axis. Moreover, the relative positioning of the PMG 110, the exciter 120, and the main generator 130 can be modified in different embodiments such that the exciter 120 is physically between the PMG 110 and the main generator 130. A perspective view of a physical embodiment of at least those portions of the generator system 100 that are mounted within a generator housing 200 is provided in FIG. 2.

Figure 2:
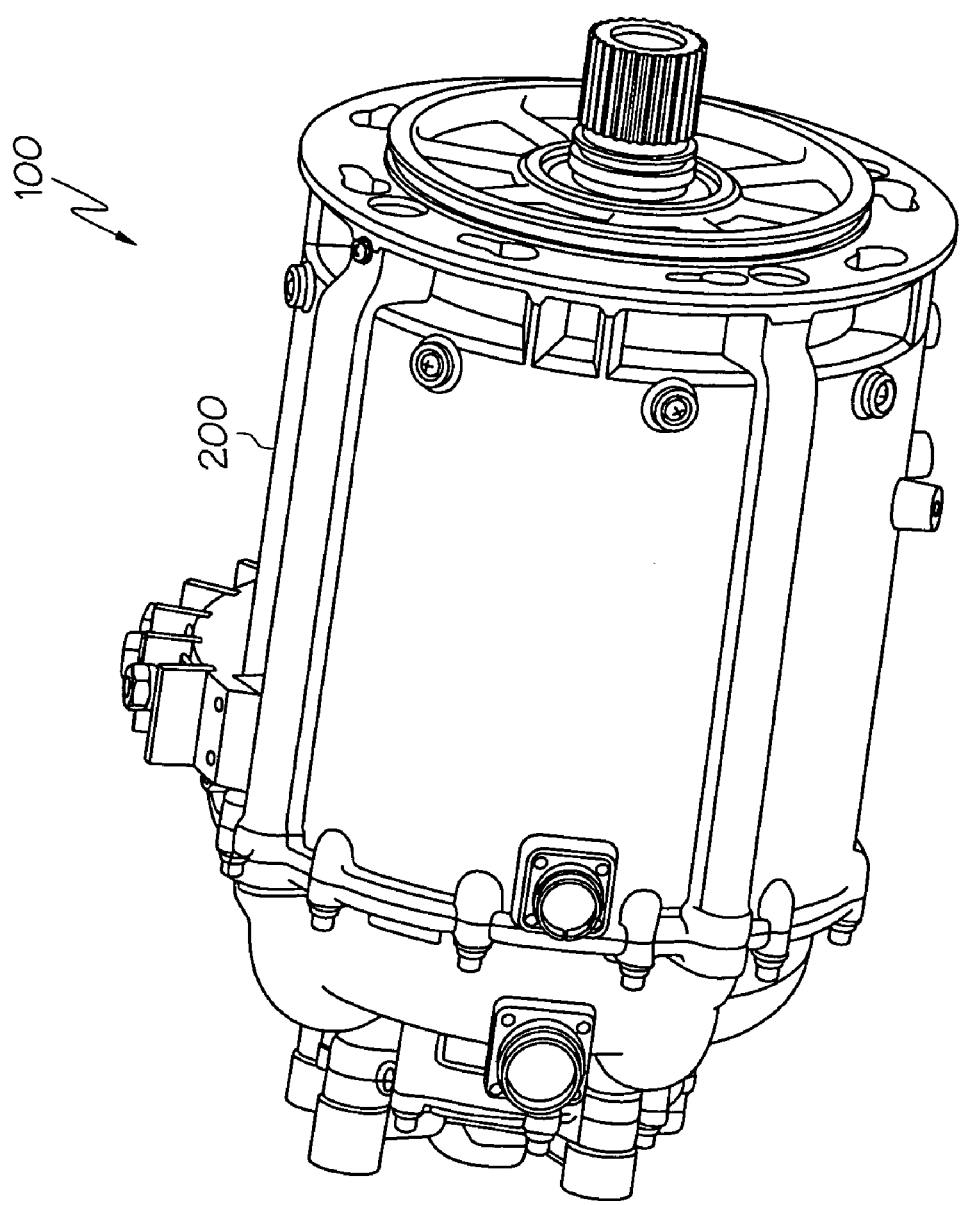
FIG. 2 is a perspective view of a physical embodiment of the generator system depicted in FIG. 1.
Figure 3:
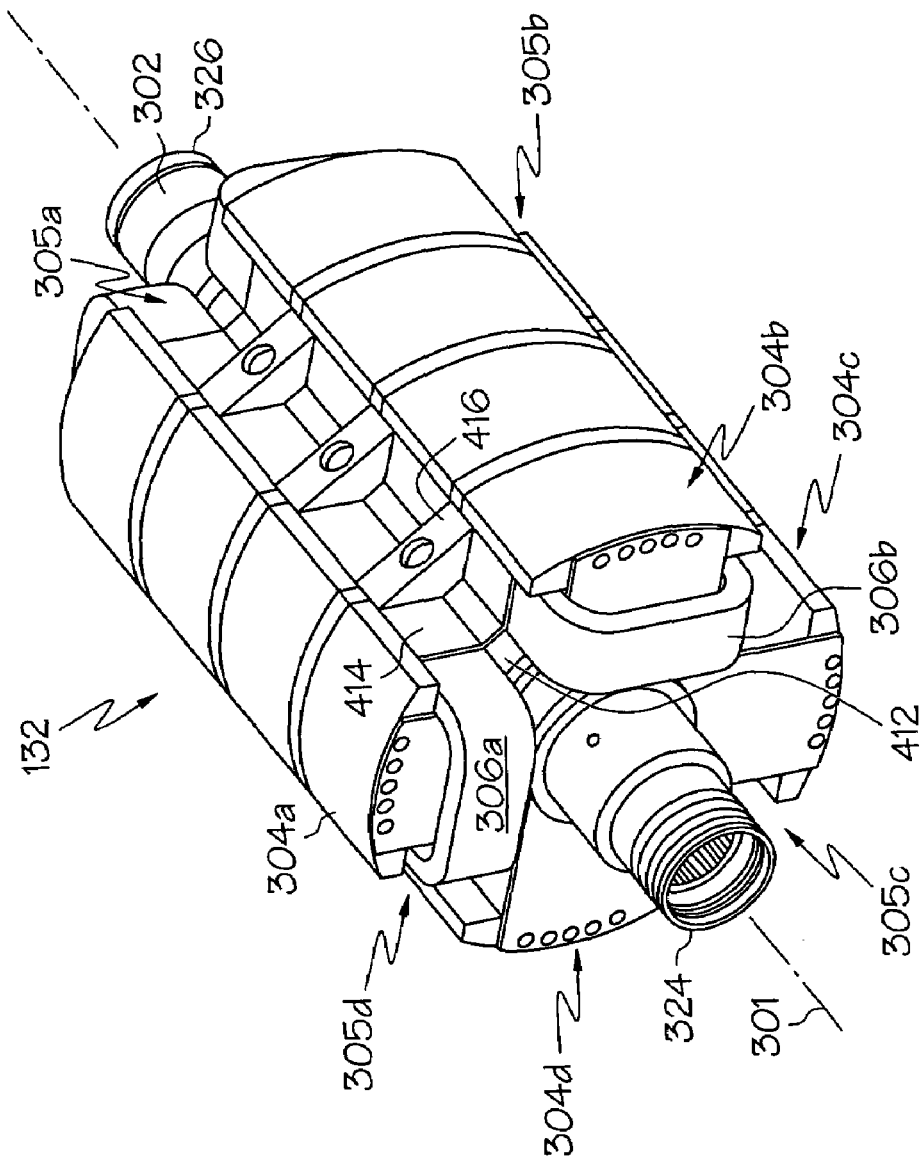
FIG. 3 is a perspective view of an exemplary embodiment of a partially assembled rotor assembly that may be used in the generator depicted in FIG. 2.
Figure 4:
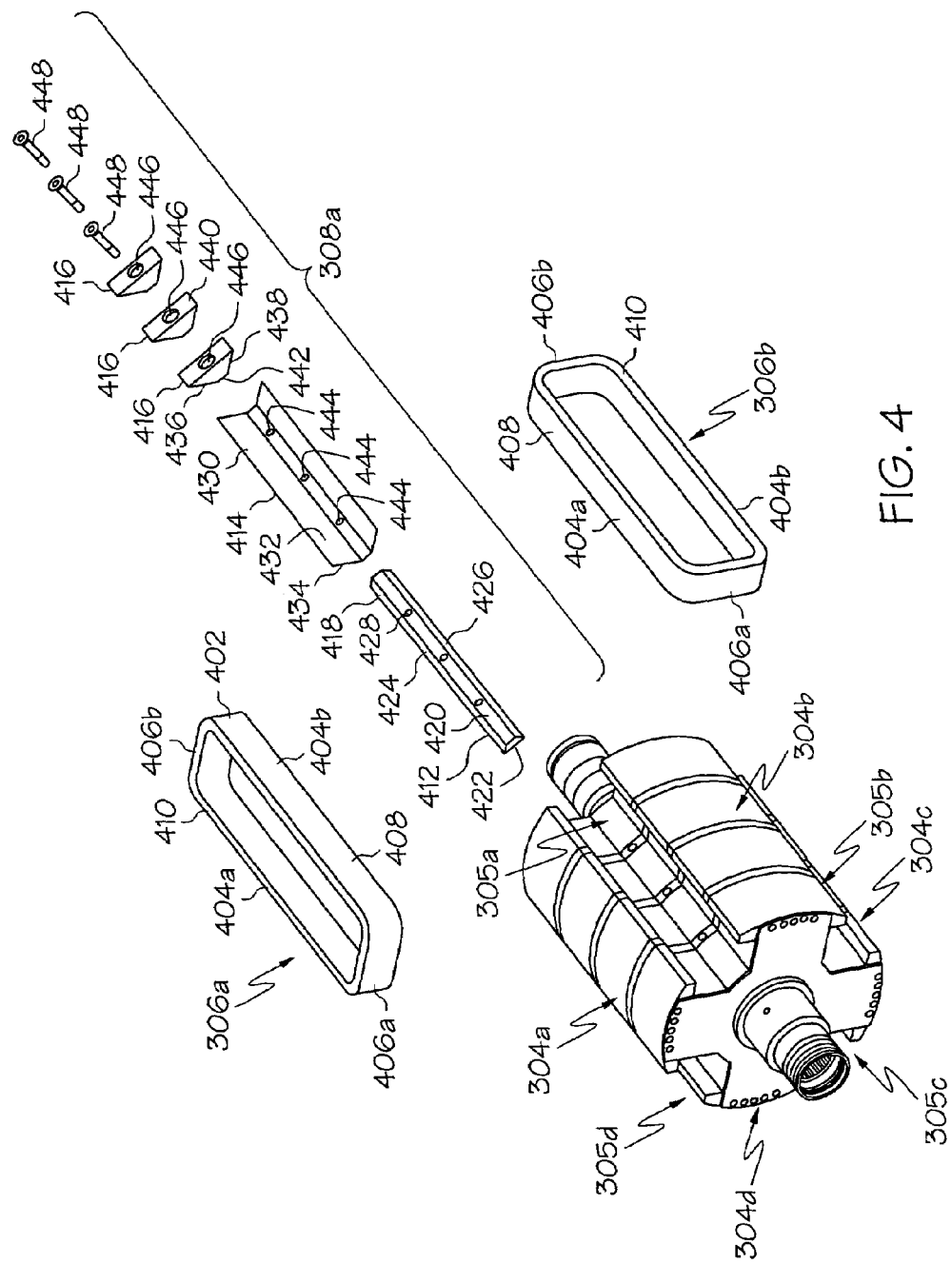
FIG. 4 is an exploded perspective view of the partially assembled rotor assembly depicted in FIG. 3.
Figure 5:
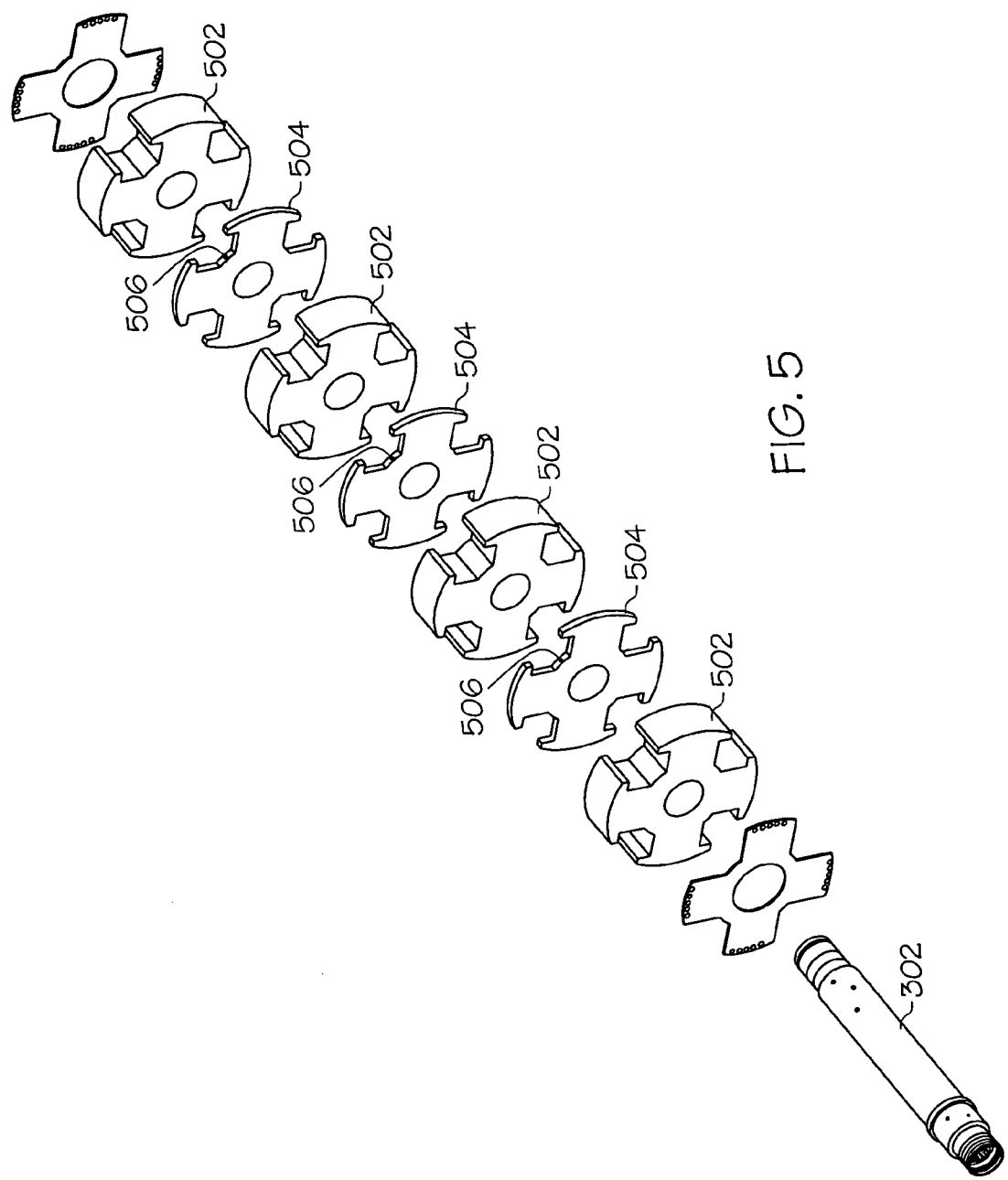
FIG. 5 is an exploded perspective view of a rotor core used in the rotor assembly depicted in FIGS. 3 and 4.

Turning now to FIGS. 3–5, perspective and exploded views of an exemplary embodiment of the main generator rotor 132 that may be used in the generator system illustrated in FIGS. 1 and 2 is shown in a partially assembled configuration. As shown, the main generator rotor 132 includes a shaft assembly 302, a plurality of poles 304a–d, and a plurality of coils 306a–d (only two shown). The shaft assembly 302 extends axially through the main generator rotor 132 along an axis 301, and includes a first end 324 and a second end 326. The first end 324 is adapted to be coupled to a non-illustrated prime mover, which could be the aforementioned gas turbine engine, and thus may be referred to as the "drive end," while the second end 326 may be referred to as the "anti-drive end." The shaft assembly 302 is substantially hollow along most of its length, and includes an opening (not illustrated) in one end and is preferably closed at the other end. In the depicted embodiment, the anti-drive end 326 is open and the drive end 324 is closed. A cooling fluid, such as oil, is supplied to the generator and is directed into the opening in the anti-drive end 326 of the shaft assembly 302. As will be described in more detail further below, the shaft assembly 302 includes a plurality of orifices that port the oil supplied to the shaft assembly 302 to the coils 306a–d, so that cooling flow may circulate past the coils 306a–d and remove heat.

The poles 304a–d extend radially away from the shaft assembly 302 and are generally spaced evenly apart from one another, forming an interpole region 305a–d between adjacent poles 304a–d. In addition, a plurality of weights (not shown) may be embedded within each of the poles 304a–d to provide proper balancing of the main generator rotor 132. As shown most clearly in FIG. 5, the poles 304a–d are formed of a plurality of laminations 502, and interlamination disks 504, both of which are shrunk fit onto the shaft assembly 302. The laminations 502, as is generally known, are continuous stacks of a magnetically permeable material. The particular material may be any one of numerous magnetically permeable materials. In a particular preferred embodiment, the laminations 502 are formed of a magnetic alloy material such as, for example, vanadium permendur. The interlamination disks 504, which are manufactured to have the same outer surface contour as the laminations 502, are formed of a high-strength material such as, for example, steel or other high-strength alloy. It will be appreciated that these materials are only exemplary, and that other suitable materials can be used for both the laminations and the interlamination disks 504. It will additionally be appreciated that the number of interlamination disks 504 may vary, and that three interlamination disks 504, as is shown in FIGS. 3–5, is merely exemplary of a particular embodiment. Moreover, although the main generator rotor 132 depicted in FIGS. 3–5 is a four-pole rotor, it will be appreciated that the present invention may be used with rotors having other numbers of poles.

The coils 306a–d are wrapped, one each, around a respective pole 304a–d, and are preferably formed by wrapping numerous individual wire windings around the respective poles 304a–d. For clarity, two of the coils 304a and 304b, which are representative of each of the coils 304a–d, are depicted in FIG. 4. As illustrated in this figure, each coil 304 includes an outer surface 402 around the outer perimeter of the coil that is formed from the outermost layer of wire windings of the coil 304a. The outer surface 402 includes two sides 404a,b and two end turns 406a,b. The outer surface sides 404a,b are made up of wire segments that are wrapped across the sides of the pole 304a and that predominantly follow directions parallel to the axis 301. In contrast, the end turns 406a,b are made up of wire segments that loop around the ends of the pole 304a and that follow paths that are predominantly within planes that are perpendicular to the axis 301. The coil 306a also includes an inward-facing edge 408, which faces the shaft 302, and an outward-facing edge 410, which faces away from the shaft 302. It is noted that the coils 304a–d may be formed of any one of numerous conductors, but in a preferred embodiment are formed from copper.

As was noted above, many high speed generators include coil support assemblies. Thus, as is also shown in FIGS. 3 and 4, coil support assemblies 308a–d (only one shown) are positioned within each of the interpole regions 305a–d, and provide lateral and radial support for the coils 306a–d. Each coil support assembly 308 includes a lower support wedge 412, an upper support 414, and an upper support retainer 416. The lower support wedges 412 each include a main body 418 that is substantially trapezoidal in shape, and that includes top and bottom surfaces 420 and 422, respectively, and first and second opposed side surfaces 424 and 426, respectively. The lower support wedges 412 are each disposed in one of the interpole regions 305a–d, such that the side surfaces 424, 426 contact the inward-facing edges 408 of the coils 306a–d. The main body 418 additionally includes one or more openings 428 that extend between the top and bottom surfaces 420, 422.

The upper supports 414 each include a longitudinally extending main body 430, which has an inner surface 432 and an outer surface 434. As with the lower support wedges 412, the upper supports 414 are each disposed in the interpole regions 305a–d; however, the upper supports 414 are configured such that the upper support outer surfaces 434 contact the outer surface sides 404a,b of the coils 306a–d. The upper supports 414 are held in place by the upper support retainers 416, which include first and second side surfaces 436 and 438, respectively, a top surface 440 that is coupled between the side surfaces 436, 438, and a bottom surface 442 that is also coupled between the side surfaces 436, 438. As with the lower support wedges 412, the upper supports 414 and upper support retainers 416 each include one or more openings 444 and 446, respectively.

Together, the lower support wedges 412, the upper supports 414, and the upper support retainers 416 improve the strength and reliability of the coils 306a–d, to increase the life of the coil insulation system, and to minimize any rotor imbalance that may occur from movement of the coils 306a–d. To do so, the lower support wedges 412, upper supports 414, and upper support retainers 416 are secured in a manner that substantially prevents movement of the coil support assemblies 308a–d at relatively high rotor rotational speeds, without adversely affecting the electromagnetic performance of the generator system 100. The manner in which the coil support assemblies 308a–d are secured will now be described.

Returning once again to FIG. 5, it is seen that a plurality of holes 506 are formed in each of the interlamination disks 504. The number of holes 506 in each interlamination disk 504 may vary, but preferably each interlamination disk 504 includes at least one hole per coil support assembly 308a–d. Thus, in the depicted embodiment, each interlamination disk 504 includes at least four holes 506. The holes 506 in each interlamination disk 504 and the holes 428, 444, 446 formed through each of the coil support assemblies 308a–d are collocated. In addition, each of the interlamination disk holes 506 is preferably tapped, or otherwise threaded, so as to receive a threaded fastener. In a particular preferred embodiment, a threaded fastener 418 (see FIG. 4) is inserted through each of the coil support assemblies 308a–d, and is threaded into each interlamination disk hole 506. Thus, the coil support assemblies 308a–d are held securely in place, and movement of any part of the coil support assemblies 308a–d is substantially prohibited, even at relatively high rotor rotational speeds.

Figure 6:
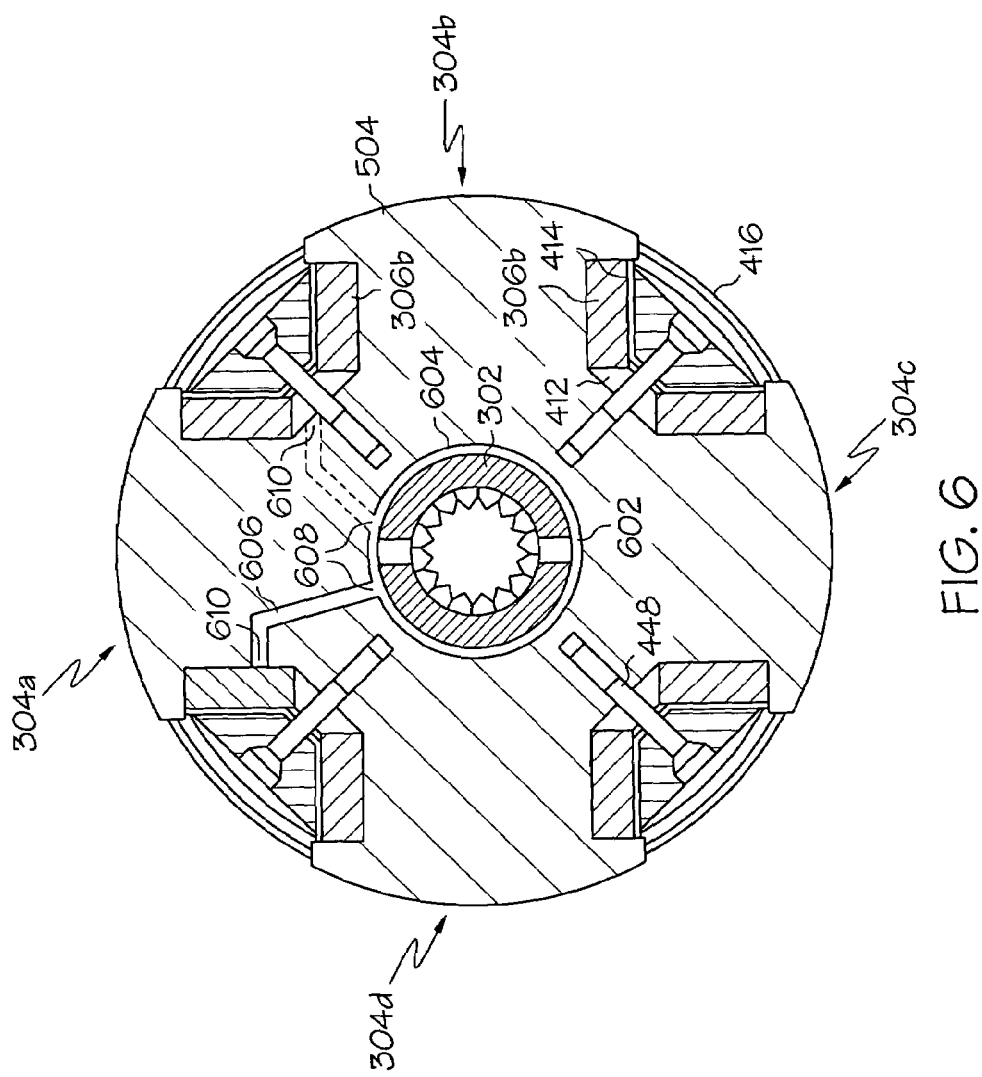
FIG. 6 is a cross section view of a fully assembled rotor assembly taken through one of the interlamination disks of the rotor assembly shown in FIGS. 3 and 4.

As was previously mentioned, cooling oil is directed into the opening in the shaft assembly anti-drive end 326. With reference now to FIG. 6, which is a cross section view of a fully assembled main generator rotor 132 through one of the interlamination disks 504, it is seen that the cooling oil supplied to the shaft 302 is directed out a plurality of orifices 602. The orifices 602 are preferably collocated with one or more of the interlamination disks 504. An annular region 604 is formed between the shaft assembly 302 and the interlamination disk 504, and is in fluid communication with the collocated orifices 602. In addition, one or more flow passages 606 are formed in one or more of the interlamination disks 504. These flow passages 606 each include an inlet port 608 in fluid communication with the annular region 604, and an outlet port 610 in fluid communication with at least one of the interpole regions 305a–d. In one embodiment, the fluid outlet port 610 is configured to port fluid directly onto the coils 306a–d. In an alternative embodiment, which is shown in phantom in FIG. 6, the fluid outlet port 610 is configured to port fluid onto the lower support wedge 412.

The coil support assemblies described herein provide support for, and improve the strength and reliability of, the generator coils. The support assemblies additionally increase the life of the coil insulation system, and minimize any rotor imbalance that may occur from movement of the coils, and do so without causing rotor winding insulation chafing, and/or rotor imbalance, and/or increased windage losses, and/or lamination pole tip damage.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A high speed generator, comprising:
   a stator; and a rotor rotationally mounted at least partially within the stator, the rotor including:
a shaft,
at least a first and a second pole, each pole formed of at least a plurality of laminations and extending radially outwardly from the shaft, each pole spaced apart from one another to form an interpole region therebetween,
an interlamination disk disposed between at least two of the laminations, and
a coil support assembly positioned in the interpole region and coupled to the interlamination disk.

2. The generator of claim 1, further comprising:
a fastener coupled to the coil support assembly and the interlamination disk.

3. The generator of claim 2, further comprising:
a first opening extending through in the coil support assembly;
a second opening formed in the interlamination disk and substantially collocated with the first opening; and
a fastener extending through the first opening and into the second opening, whereby the coil support assembly is coupled to the interlamination disk.

4. The generator of claim 1, wherein the shaft includes an inner surface and an outer surface, and wherein the generator further comprises:
a fluid flow port extending between the shaft inner surface and outer surface; and
a fluid flow passage formed in the interlamination disk, the flow passage having an inlet in fluid communication with the shaft fluid flow port and an outlet in fluid communication with the interpole region.

5. The generator of claim 1, further comprising:
a first coil wrapped around the first pole, the first coil including an outer surface;
a second coil wrapped around the second pole, the second coil including an outer surface,
wherein the coil support assembly contacts at least a portion of the first coil outer surface and at least a portion of the second coil outer surface.

6. The generator of claim 5, wherein the support assembly comprises:
an upper support, the upper support having a longitudinally extending main body including at least an inner surface and an outer surface, the upper support outer surface contacting at least a portion of the first and second coil outer surfaces; and
one or more upper support retainers, each retainer coupled to at least a portion of the upper support inner surface and to the interlamination disk.

7. The generator of claim 6, further comprising:
an opening extending through each upper support retainer;
one or more openings extending through the upper support, each upper support opening substantially collocated with an upper support retainer opening;
one or more openings formed in the interlamination disk, each interlamination disk opening substantially collocated with an upper support opening; and
one or more fasteners, each fastener extending through the collocated openings in the upper support retainer, the upper support, and the interlamination disk.

8. The generator of claim 6, wherein the first and second coils each further include an inward facing edge that substantially faces the shaft, and wherein the support assembly further comprises:

a lower support wedge coupled to the interlamination disk, the lower support wedge having a longitudinally extending main body, the main body including an outer surface having a top, a bottom, and first and second opposed sides, each of the opposed sides contacting at least a portion of different ones of the first and second coil inward facing edges.

9. The generator of claim 8, further comprising:
an opening extending through each upper support retainer;
one or more openings extending through the upper support, each upper support opening substantially collocated with an upper support retainer opening;
one or more openings extending between the lower support wedge top and bottom surfaces, each lower support wedge opening substantially collocated with an upper support opening;
one or more openings formed in the interlamination disk, each interlamination disk opening substantially collocated with lower support wedge opening; and
one or more fasteners, each fastener extending through the collocated openings in the upper support retainer, the upper support, and the interlamination disk.

10. The generator of claim 6, further comprising:
a plurality of interlamination disks, each of which is disposed between at least two of the laminations; and
a plurality of upper support retainers, each retainer coupled to at least a portion of the upper support inner surface and to one of the interlamination disks.

11. A rotor for use in a high speed generator, comprising:
a shaft;
at least a first and a second pole, each pole formed of at least a plurality of laminations and extending radially outwardly from the shaft, each pole spaced apart from one another to form an interpole region therebetween;
an interlamination disk disposed between at least two of the laminations; and
a coil support assembly positioned in the interpole region and coupled to the interlamination disk.

12. The rotor of claim 11, further comprising:
a fastener coupled to the coil support assembly and the interlamination disk.

13. The rotor of claim 12, further comprising:
a first opening extending through in the coil support assembly;
a second opening formed in the interlamination disk and substantially collocated with the first opening; and
a fastener extending through the first opening and into the second opening, whereby the coil support assembly is coupled to the interlamination disk.

14. The rotor of claim 11, wherein the shaft includes an inner surface and an outer surface, and wherein the generator further comprises:
a fluid flow port extending between the shaft inner surface and outer surface; and
a fluid flow passage formed in the interlamination disk, the flow passage having an inlet in fluid communication with the shaft fluid flow port and an outlet in fluid communication with the interpole region.

15. The rotor of claim 11, further comprising:
a first coil wrapped around the first pole, the first coil including an outer surface;
a second coil wrapped around the second pole, the second coil including an outer surface,
wherein the coil support assembly contacts at least a portion of the first coil outer surface and at least a portion of the second coil outer surface.

16. The rotor of claim 15, wherein the support assembly comprises:
an upper support, the upper support having a longitudinally extending main body including at least an inner surface and an outer surface, the upper support outer surface contacting at least a portion of the first and second coil outer surfaces; and
one or more upper support retainers, each retainer coupled to at least a portion of the upper support inner surface and to the interlamination disk.

17. The rotor of claim 16, further comprising:
an opening extending through each upper support retainer;
one or more openings extending through the upper support, each upper support opening substantially collocated with an upper support retainer opening;
one or more openings formed in the interlamination disk, each interlamination disk opening substantially collocated with an upper support opening; and
one or more fasteners, each fastener extending through the collocated openings in the upper support retainer, the upper support, and the interlamination disk.

18. The rotor of claim 16, wherein the first and second coils each further include an inward facing edge that substantially faces the shaft, and wherein the support assembly further comprises:
a lower support wedge coupled to the interlamination disk, the lower support wedge having a longitudinally extending main body, the main body including an outer surface having a top, a bottom, and first and second opposed sides, each of the opposed sides contacting at least a portion of different ones of the first and second coil inward facing edges.

19. The rotor of claim 18, further comprising:
an opening extending through each upper support retainer;
one or more openings extending through the upper support, each upper support opening substantially collocated with an upper support retainer opening;
one or more openings extending between the lower support wedge top and bottom surfaces, each lower support wedge opening substantially collocated with an upper support opening;
one or more openings formed in the interlamination disk, each interlamination disk opening substantially collocated with lower support wedge opening; and
one or more fasteners, each fastener extending through the collocated openings in the upper support retainer, the upper support, and the interlamination disk.

20. The rotor of claim 16, further comprising:
a plurality of interlamination disks, each of which is disposed between at least two of the laminations; and
a plurality of upper support retainers, each retainer coupled to at least a portion of the upper support inner surface and to one of the interlamination disks.

21. The rotor of claim 11, further comprising:
a plurality of interlamination disks, each interlamination disk spaced apart from one another and disposed between at least two of the laminations,
wherein the coil support assembly is coupled to each of the interlamination disks.

22. An interpole coil support assembly for placement in an interpole region that is formed between adjacent poles of a rotor assembly, comprising:
a lower support wedge having a longitudinally extending main body, the main body having at least first and second opposed sides, and one or more openings extending through the main body between the first and second sides;
a upper support having a longitudinally extending main body, the main body having at least an inner surface, an outer surface, and one or more openings extending therebetween;
one or more upper support retainers, each retainer having at least two side surfaces a top surface coupled between the side surfaces, a bottom surface coupled between the side surfaces, and an opening extending between the top and bottom surfaces, each side surface configured to engage the upper support inner surface; and
one or more fasteners, each fastener adapted to extend through the opening in the upper support retainer, through one of the openings in the upper support, and through one of the openings in the lower support wedge.

* * * * *